United States Patent
Cook

(10) Patent No.: US 7,035,813 B1
(45) Date of Patent: Apr. 25, 2006

(54) PRODUCT REGISTRATION USING A CODE PROCESSING SYSTEM

(75) Inventor: Fred S. Cook, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 734 days.

(21) Appl. No.: 09/784,368

(22) Filed: Feb. 15, 2001

(51) Int. Cl.
*G06F 17/60* (2006.01)

(52) U.S. Cl. .............. 705/16; 705/17; 705/21; 705/14

(58) Field of Classification Search .......... 705/16, 705/17, 20, 21, 24, 10, 14
See application file for complete search history.

(56) References Cited

U.S. PATENT DOCUMENTS

| | | | | |
|---|---|---|---|---|
| 5,577,109 | A | * 11/1996 | Stimson et al. | 379/114.2 |
| 6,000,608 | A | * 12/1999 | Dorf | 235/380 |
| 6,189,787 | B1 | * 2/2001 | Dorf | 235/380 |
| 2001/0024245 | A1 | * 9/2001 | Choi et al. | 349/43 |
| 2001/0034722 | A1 | * 10/2001 | Tidball et al. | 705/73 |
| 2002/0077973 | A1 | * 6/2002 | Ronchi et al. | 705/39 |

FOREIGN PATENT DOCUMENTS

WO  WO 00/79496 A2 * 12/2000

OTHER PUBLICATIONS

Parker, Akweli. Virginia Beach, VA., Outfit Finds Its Niche in Prepaid Calling Card Business. Virginia–Pilot. Oct. 29, 2000.*

* cited by examiner

*Primary Examiner*—James S. McClellan

(57) ABSTRACT

A product registration system and method is disclosed that automatically registers a product with a manufacturer. In the product registration system, a point of sale system obtains a communication code that is associated with a product and transfers the communication code to a code processing system. Examples of the communication code include a phone card code or a pre-paid phone card code. The code processing system processes the communication code to determine manufacturer information for the product. The code processing system transfers a product registration request to a manufacturer registration system based on the manufacturer information to register the product with the manufacturer. The code processing system also transfers the communication code and a communication code activation request to a communication code activation system to activate the communication code. The product registration system advantageously automates product registration and communication code activation.

20 Claims, 6 Drawing Sheets

PRODUCT REGISTRATION SYSTEM 100

PRODUCT REGISTRATION USING A CODE PROCESSING SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications systems, and in particular, to a system and method for registering products with a manufacturer using a code processing system.

2. Description of the Prior Art

Manufacturers of products sometimes offer additional warranties on their products other than those prescribed by law. Some of these additional warranties are not activated until the purchaser, also referred to as the consumer, somehow contacts the manufacturer to activate the warranty. In other words, warranties are available to the consumer, but the warranties are not active upon purchase of the product. The consumer has to contact the manufacturer to request activation of the warranty on the product. For instance, the consumer could call the manufacturer to register the purchased product with the manufacturer. The consumer could also mail in a warranty activation card that is packaged with the product. The consumer could also activate the warranty through email or through a home web page for the manufacturer. The manufacturer registers the product in response to the activation request, in a database for example. The manufacturer then "turns-on" or activates the warranty on the product. The consumer can then seek restitution from the manufacturer in the event that a product is found to be defective. The consumer can also receive product updates, notices, upgrade offers, and other information from the manufacturer.

Similarly, phone companies distribute or sell pre-paid phone cards that are not activated. If a consumer attempts to make a call using a non-activated phone card, then the phone companies deny the consumer access to the system. The phone companies have a record of the pre-paid phone cards and the records initially have the pre-paid phone cards listed as not activated. They are not activated to avoid stealing of the cards or unauthorized use of the cards. The phone cards include a code for activating the cards. A merchant can activate a phone card by calling the phone company and supplying the phone company with an authentication of the merchant and an activation code. The phone company finds the activation code in its database and activates the phone cards associated with the activation code.

Many sellers of products, particularly retail sellers, use point of sale systems to read the price of a product and accept payment for the product. A point of sale system, such as a bar code reader or some other device, reads product information from a product and displays a price for the product. The consumer then provides the point of sale system with a financial card number to provide payment for the product. The financial card number could be a credit card number, a bank card number, a debit card number, or some other financial transaction number. The point of sale system communicates with a financial network over the Public Switched Telephone Network (PSTN) or a private line. The point of sale system transmits a charge authorization request, the card number, and other information pertaining to the sale to the financial network. The financial network processes the charge authorization request, the card number, and the other sale information and generates an authorization response. The authorization response indicates whether the card transaction is allowed. The financial network transmits the authorization response to the point of sale system over the PSTN or the private line. The point of sale system receives the authorization response and displays the response for the sales clerk and the consumer.

Unfortunately, the point of sale system and financial network have not been effectively adapted to communicate with a manufacturer to register products. Consumers that have to actively register products themselves, such as to activate a warranty, may not take the time to register the product they purchase. Consequently, the consumers are not getting full protections offered by the manufacturers.

SUMMARY OF THE INVENTION

The invention helps to solve the above problems by automatically registering products with the manufacturer. Advantageously, the invention increases the number of consumers that register products with manufacturers. The invention also makes it easier for consumers to activate warranties on products that they purchase.

One aspect of the invention comprises a product registration system that registers a product when the product is purchased. The product registration system is comprised of a point of sale system, a code processing system, a manufacturer registration system, and a communication code activation system. The point of sale system obtains a communication code that is associated with the product being purchased. The communication code could include a calling card code, a phone card code, or a pre-paid phone card code. The point of sale system transmits the communication code to the code processing system.

The code processing system processes the communication code to determine manufacturer information for the product. The code processing system generates a product registration request and transmits the product registration request to the manufacturer registration system based on the manufacturer information. The code processing system also generates a communication code activation request. The code processing system transmits the communication code activation request and the communication code to the communication code activation system for activation of the communication code.

A second aspect of the invention comprises a product warranty activation system that automatically activates a warranty on a product being purchased. The product warranty activation system is comprised of a point of sale system, a code processing system, a financial network, a manufacturer warranty activation system, and a phone card activation system. For this aspect, manufacturers package their products with phone cards. The point of sale system obtains a phone card code that is associated with the product being purchased. The point of sale system also obtains a financial card number that is used to purchase the product. The point of sale system transmits the phone card code and the financial card number to the code processing system.

The code processing system transmits the financial card number to the financial network to authorize the charge. If the code processing system receives an authorization response from the financial network that the charge was authorized, then the code processing system processes the phone card code to determine product information and manufacturer information for the product. The code processing system generates a warranty activation request and transmits the warranty activation request and the product information to the manufacturer warranty activation system based on the manufacturer information. The code processing system also generates a phone card activation request. The code processing system transmits the phone card activation request and the phone card code to the phone card activation system for activation of the phone card. Automatically activating the warranty on the product can save the consumer time and effort. Packaging the phone cards with the products and automatically activating the phone cards can advantageously advertise phone card use for phone companies.

BRIEF DESCRIPTION OF THE DRAWINGS

The appended claims set forth the features of the present invention with particularity. The invention, together with its advantages, may be best understood from the following detailed description taken in conjunction with the accompanying drawings.

DETAILED DESCRIPTION OF THE INVENTION

Figure 1:
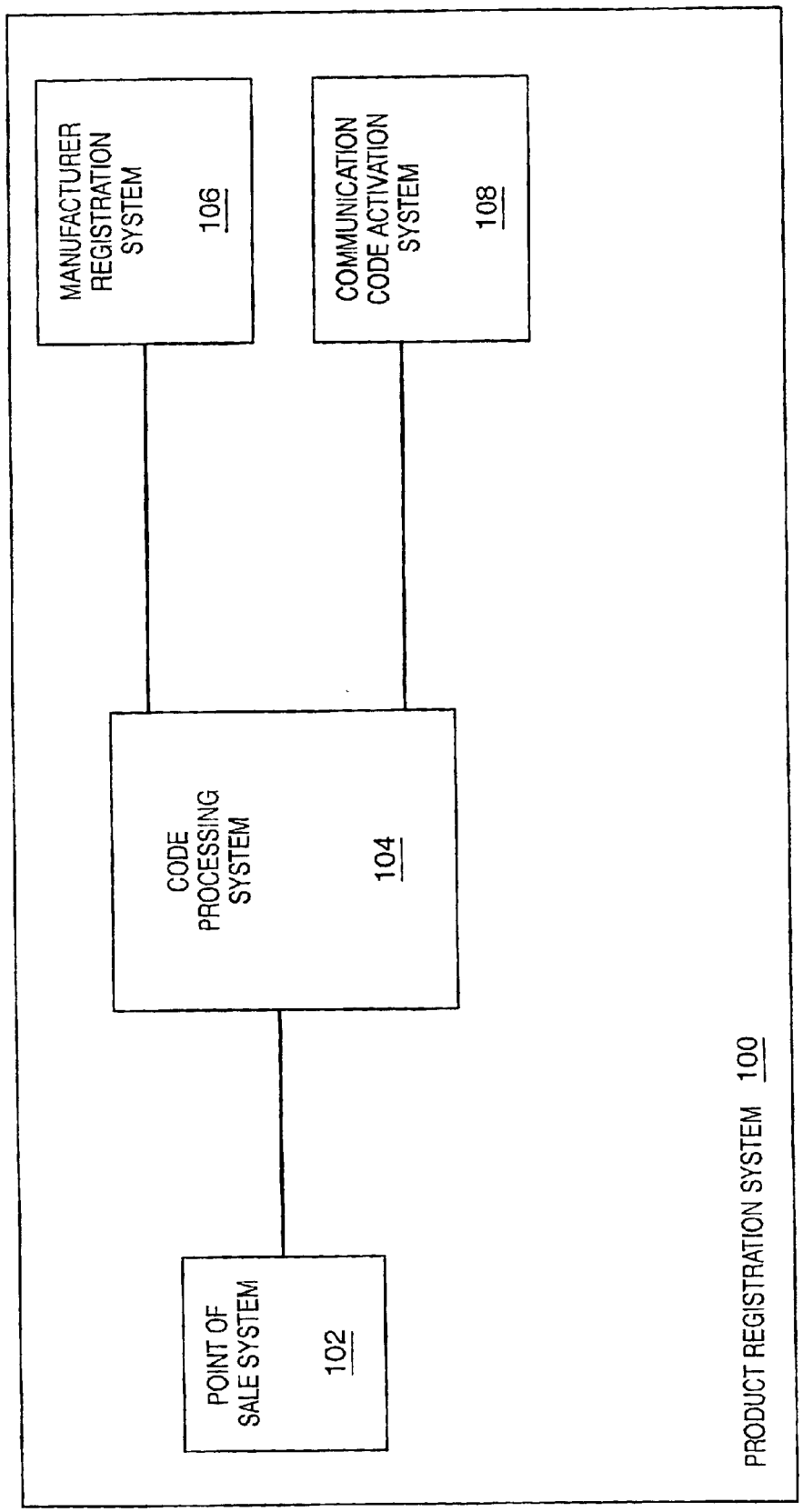
FIG. 1 is a block diagram that illustrates a product registration system in an example of the invention.
Figure 2:
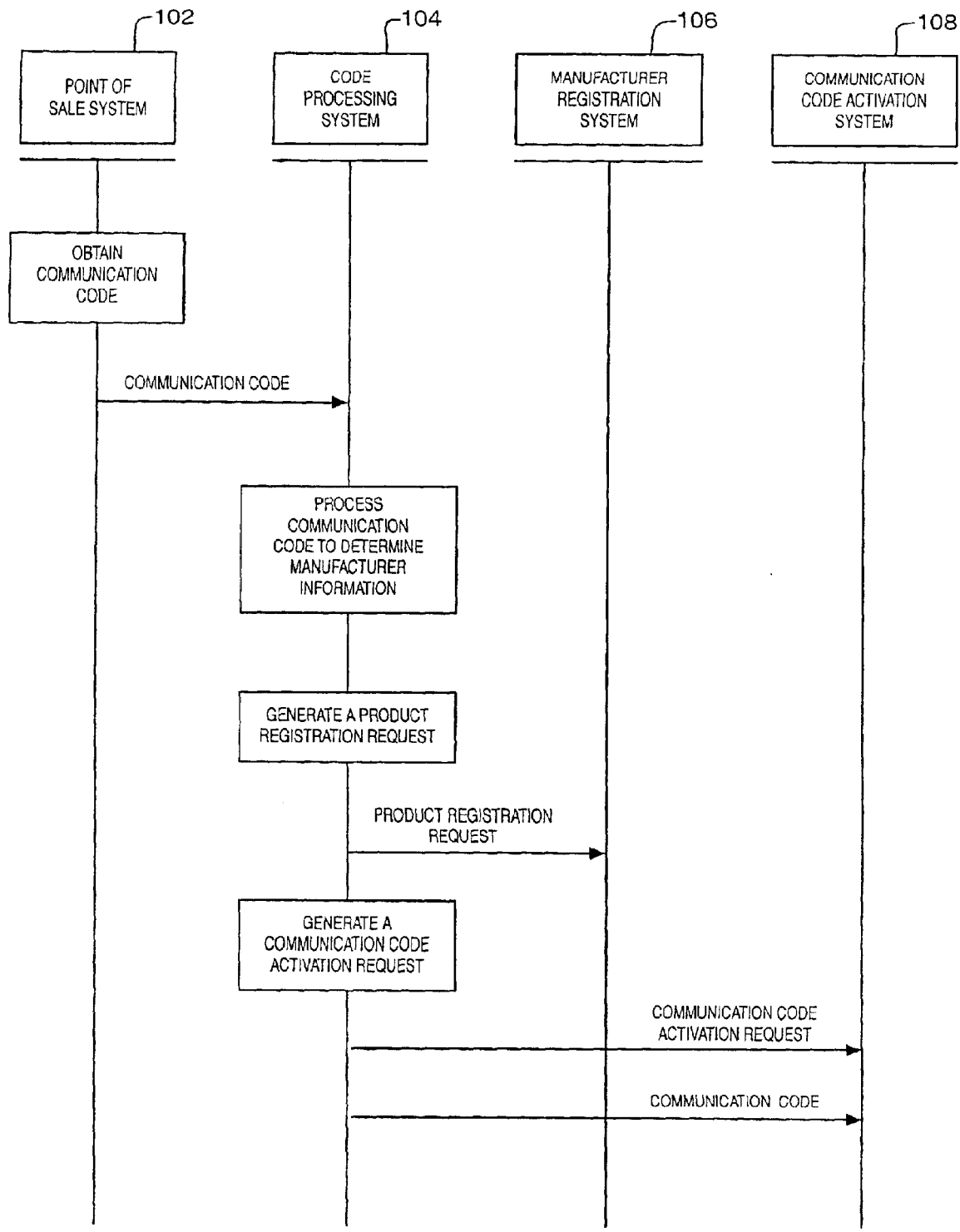
FIG. 2 illustrates a message sequence diagram for the product registration system in FIG. 1 in an example of the invention.

A Product Registration System—FIGS. 1–2

FIGS. 1–2 depict an example of a product registration system in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 1–2 have been simplified or omitted for clarity.

FIG. 1 depicts product registration system 100 in an example of the invention. Product registration system 100 comprises a point of sale system 102, a code processing system 104, a manufacturer registration system 106, and a communication code activation system 108. Code processing system 104 is configured to communicate with point of sale system 102, manufacturer registration system 106, and communication code activation system 108.

Point of sale system 102 is any system configured to facilitate the selling of a product. Code processing system 104 is any system configured to process a communication code to facilitate registering a product with a manufacturer. Manufacturer registration system 106 is any system configured to register a product with a manufacturer. Communication code activation system 108 is any system configured to activate a communication code.

FIG. 2 depicts a message sequence chart for product registration system 100 to register a product. Point of sale system 102 obtains a communication code that is associated with the product. In some examples, the communication code includes a calling card code, a phone card code, a pre-paid phone card code, or some other code. Point of sale system 102 transmits the communication code.

Code processing system 104 receives the communication code. Code processing system 104 processes the communication code to determine manufacturer information for the product. Code processing system 104 generates a product registration request. Code processing system 104 transmits the product registration request to manufacturer registration system 106 based on the manufacturer information to register the product with a manufacturer.

Code processing system 104 also generates a communication code activation request responsive to receiving the communication code. Code processing system 104 transmits the communication code activation request and the communication code to communication code activation system 108 for activation of the communication code.

A Product Warranty Activation System—FIGS. 3–6

FIGS. 3–6 depict a specific example of a product warranty activation system in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 3–6 have been simplified or omitted for clarity.

Figure 3:
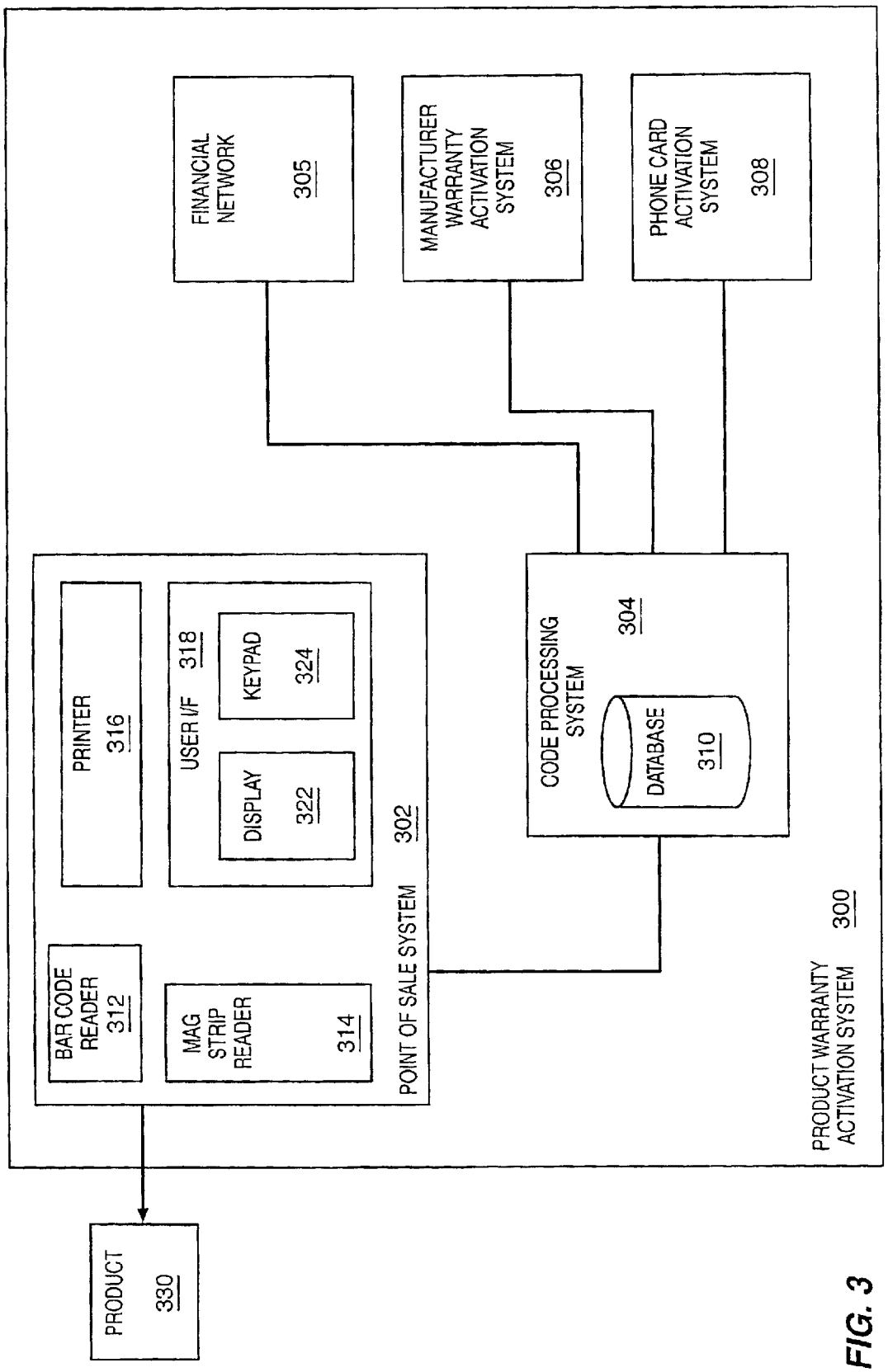
FIG. 3 is a block diagram that illustrates a product warranty activation system in an example of the invention.

FIG. 3 depicts a product warranty registration system 300 in an example of the invention. Product warranty registration system 300 is comprised of a point of sale system 302, a code processing system 304, a financial network 305, a manufacturer warranty activation system 306, and a phone card activation system 308. Code processing system 304 includes a database 310. Code processing system 304 is configured to communicate with point of sale system 302, financial network 305, manufacturer warranty activation system 306, and phone card activation system 308 over the Public Switched Telephone Network (PSTN).

Point of sale system 302 is a system used by a seller to facilitate the selling of a product. Point of sale system 302 includes a bar code reader 312, a magnetic strip reader 314, a printer 316, and a user interface 318. User interface 318 includes a display 322 and a keypad 324. Code processing system 304 is conjured to process a phone card code to facilitate registering a warranty on a products Financial network 305 is configured to process financial card numbers to authorize financial transactions. Examples of financial network 305 include credit card systems, debit card systems, and bank card systems. Manufacturer warranty activation system 306 is configured to activate a warranty on a product with a manufacturer. Phone card activation system 308 is configured to activate a phone card.

Figure 4:
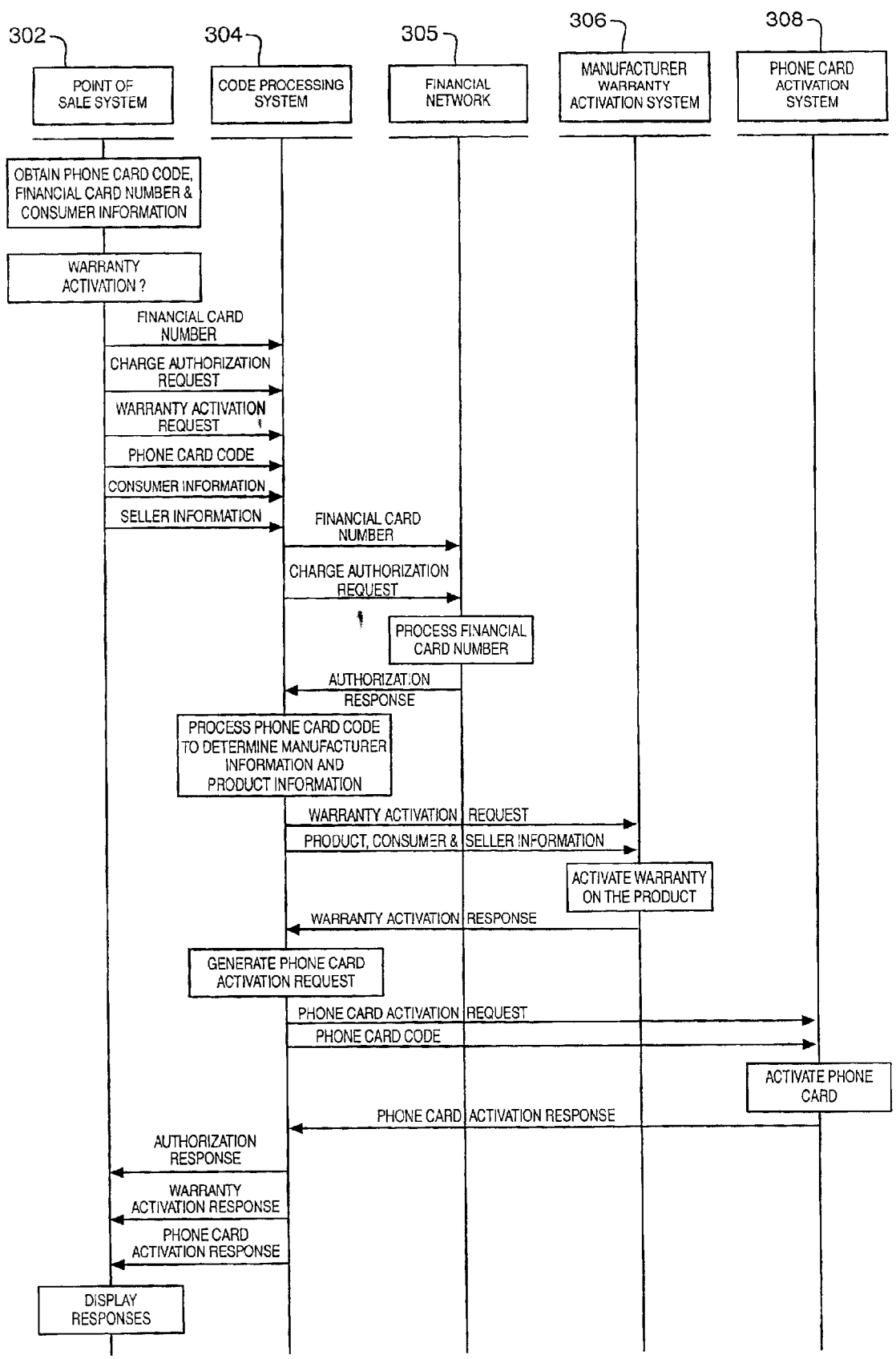
FIG. 4 illustrates a message sequence diagram for the product warranty activation system in FIG. 3 in an example of the invention.

FIG. 4 depicts a message sequence diagram for product warranty activation system 300 in an example of the invention. Point of sale system 302 obtains a phone card code from product 330. Product 330 is packaged with a phone card that includes the phone card code. One example of the phone card code is a pre-paid phone card code. Point of sale system 302 obtains the phone card code by reading a bar code using bar code reader 312, by reading a magnetic strip using magnetic strip reader 314, or by having the consumer or a store clerk enter the phone card code using keypad 324. Point of sale system 302 also obtains a financial card number to purchase the product. Point of sale system 302 obtains the financial card number by reading a magnetic strip on a card using magnetic strip reader 314 or by having the consumer or the store clerk enter the financial card number using keypad 324. Examples of the financial card number include credit card numbers, debit card numbers, or bank card numbers. Point of sale system 302 generates a charge authorization request responsive to obtaining the financial card number.

Point of sale system 302 then prompts the consumer to determine if the consumer wants to register product 330 with the manufacturer and activate the warranty on product 330. Point of sale system 302 prompts the consumer using user interface 318. Those skilled in the art will appreciate that point of sale system 302 could automatically determine that the consumer wants to activate the warranty on product 330 by purchasing product 330. If the consumer wants to activate the warranty on product 330, then point of sale system 302 generates a warranty activation request. Point of sale system 302 also obtains consumer information. In some examples, point of sale system 302 reads a credit card, a debit card, a store discount card, or some other card to obtain the consumer information. In some examples, point of sale system 302 prompts a consumer for consumer information using user interface 318.

Point of sale system 302 transfers the financial card number, the charge authorization request, the warranty activation request, the phone card code, and the consumer information to code processing system 304. Point of sale system 302 also transfers seller information to code processing system 304. Those skilled in the art will appreciate that point of sale system 302 is programmed with seller; information that includes store identifiers, clerk identifiers, time of day, amount of purchase, and other information.

Code processing system 304 receives the financial card number, the charge authorization request, the warranty activation request, the phone card code, the consumer information, and the seller information. Code processing system 304 transfers the financial card number and the charge authorization request to financial network 305. Financial network 305 processes the financial card number based on the charge authorization request to generate an authorization response. The authorization response indicates whether or not the charge to the financial card number was allowed. Financial network 305 transfers the authorization response to code processing system 304.

If the charge was authorized, then code processing system 304 processes the phone card code to determine product information and manufacturer information for product 330. To determine the product information and the manufacturer information, code processing system 304 looks up the phone card code in database 310. Each phone card code corresponds to a product and a manufacturer. In this example, code processing system 304 is controlled by the same communication provider that provides the phone service for the phone card packaged with product 330. The communication provider can therefore program each phone card code into database 310. If code processing system 304 finds the phone card code in database 310, then code processing system 304 locates the product information and the manufacturer information for product 330. Some examples of product information include serial numbers, model numbers, product price, and other information on a product. Based on the manufacturer information, code processing system 304 determines who manufactured product 330 and how to communicate with that manufacturer. In this example, the manufacturer information includes information about manufacturer warranty activation system 306.

Those skilled in the art will appreciate that point of sale device 302 could also obtain the product information and transfer the information to code processing system 304. For example, point of sale device 302 could read a bar code from the product to obtain the product information.

Code processing system 304 transmits the warranty activation request, the product information, the consumer information, and the seller information to manufacturer warranty activation system 306 based on the manufacturer information. Those skilled in the art will appreciate that code processing system 304 could also format the product information, the consumer information, and the seller information based on the manufacturer information before transmitting the information to manufacturer warranty activation system 306. Manufacturer warranty activation system 306 processes the product information, the consumer information, and the seller information in response to receiving the warranty activation request. Manufacturer warranty activation system 306 activates the warranty on product 330 and generates a warranty activation response. Manufacturer warranty activation system 306 transfers the warranty activation response to code processing system 304.

Code processing system 304 generates a phone card activation request responsive to receiving the phone card code. Code processing system 304 transfers the phone card activation request and the phone card code to phone card activation system 308. Phone card activation system 308 processes the phone card code in response to receiving the phone card activation request to activate the phone card. Phone card activation system 308 generates a phone card activation response and transfers the phone card activation response to code processing system 304. Those skilled in the art will appreciate that point of sale system 302 could also generate the phone card activation request and transmit the phone card code and the phone card activation request to phone card activation system 308.

Code processing system 304 transfers the authorization response, the warranty activation response, and the phone card activation response to point of sale system 302. Point of sale system 302 displays the authorization response, the warranty activation response, and the phone card activation response using display 322. In some examples, point of sale system 302 prints a warranty certificate, using printer 316, based on the warranty activation response. In some examples, point of sale system 302 prints a phone card activation certificate, using printer 316, based on the phone card activation response. In some examples, point of sale system 302 prints a receipt, using printer 316, based on the authorization response.

Figure 5:
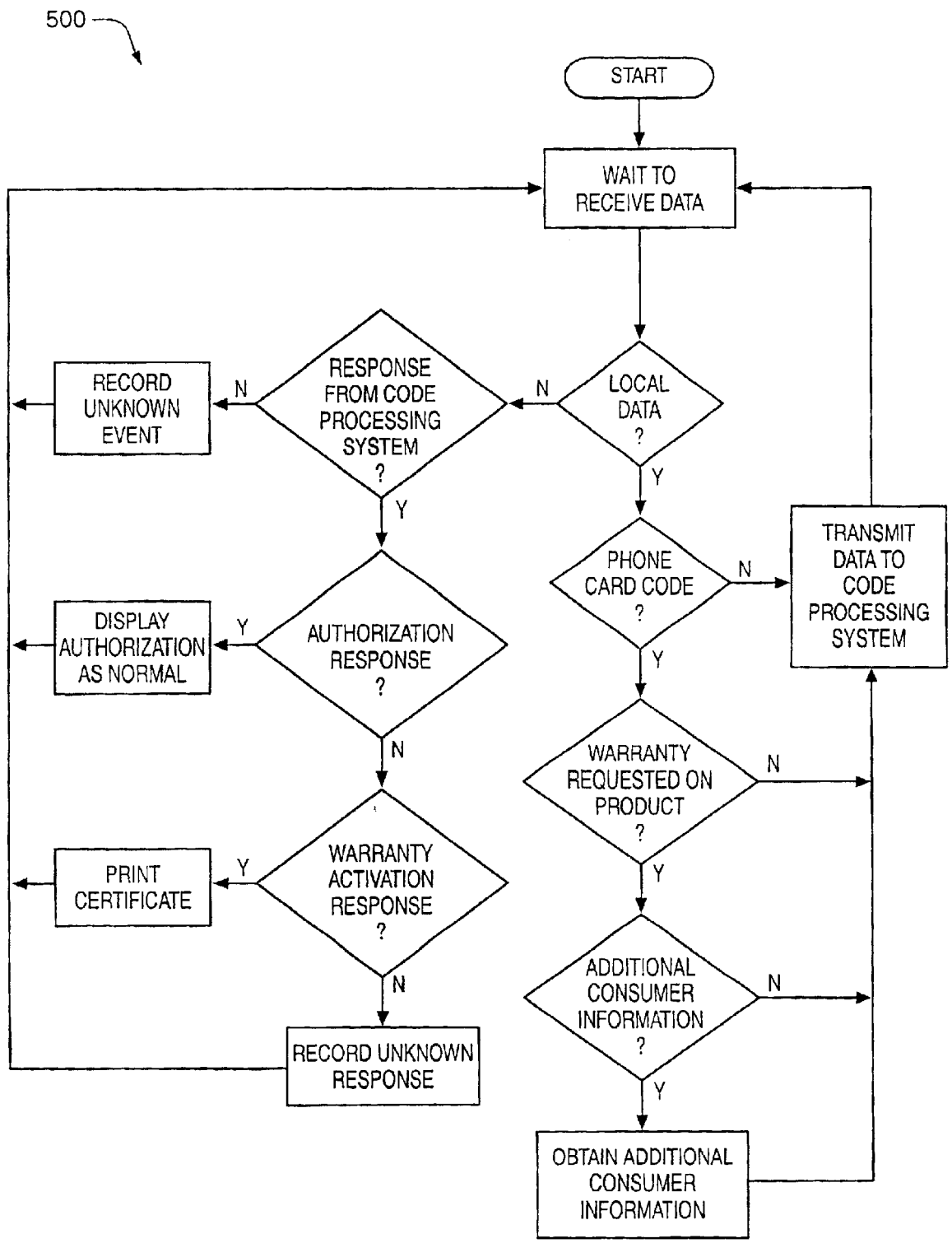
FIG. 5 is a flow diagram that illustrates logic executed by a point of sale system in an example of the invention.

FIG. 5 depicts logic 500 that could be executed by point of sale system 302 in an example of the invention. Point of sale system 302 waits to receive data. The data could be a financial card number, a phone card code, consumer information, a warranty activation request, a warranty activation response, a phone card activation response, an authorization response, or some other data. Point of sale system 302 determines if the data is local data. Local data is data that is not received from code processing system 304.

If the data is local, then point of sale system 302 determines if the data is a phone card code. If the data is a phone card code, then point of sale system 302 determines if the consumer wants to activate a warrant on the product. If the consumer does not want to activate the warranty, then point of sale system 302 transmits the data to code processing system 304. If the consumer does want to activate the warranty, then point of sale system 302 determines if additional consumer information needs to be obtained. If additional consumer information does not need to be obtained, then point of sale system 302 transmits the data to code processing system 304. If additional consumer information needs to be obtained, then point of sale system 302 obtains the additional consumer information. Point of sale system 302 then transfers the data to code processing system 304.

If the information is not local, then point of sale system 302 determines if the data is a response from code processing system 304. If the data is a response from code processing system 304, then point of sale system 302 determines if the data is an authorization response for the financial card number. If the data is an authorization response, then point of sale system 302 displays the authorization response. If the data is not an authorization response, then point of sale system 302 determines if the data is a warranty activation response. If the data is a warranty activation response, then point of sale system 302 displays the warranty activation response and prints a warranty certificate based on the warranty activation response.

Figure 6:
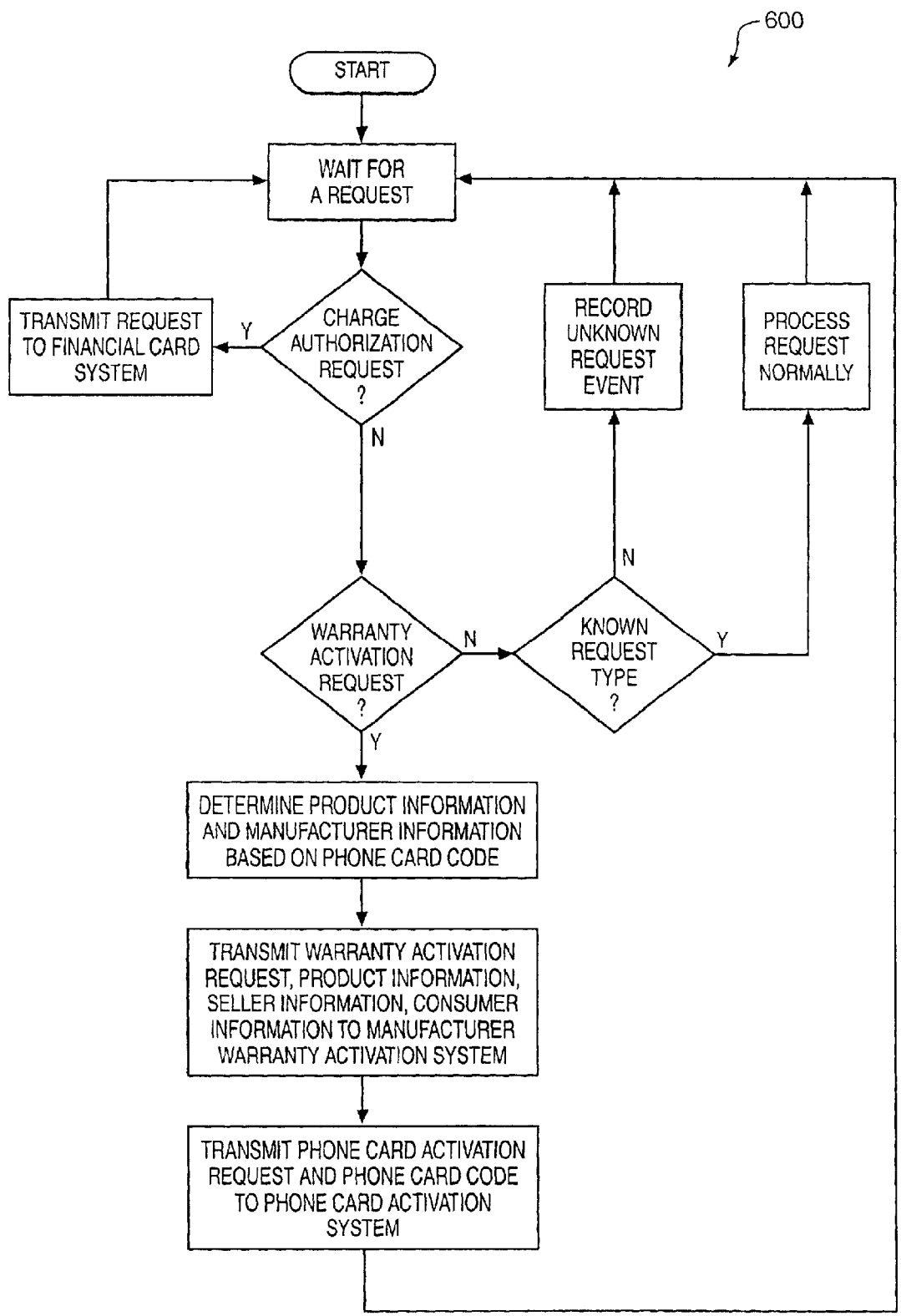
FIG. 6 is a flow diagram that illustrates logic executed by a code processing system in an example of the invention.

FIG. 6 depicts logic 600 that could be executed by code processing system 304 in an example of the invention. Code processing system 304 waits for a request. If the request is an authorization request for authorization of a financial card number, then code processing system 304 transmits the authorization request to financial network 305. If the request is a warranty activation request, then code processing system 304 determines product information and manufacturer information based on the phone card code by looking up the phone card code in database 310. Code processing system 304 transmits the warranty activation request, the product information, seller information, and consumer information to manufacturer warranty activation system 306 based on the manufacturer information. Code processing system 304 generates a phone card activation request responsive to receiving a phone card code and transmits the phone card activation request and the phone card code to phone card activation system 308.

Those skilled in the art will appreciate that code processing system 304, financial network 305, manufacturer warranty activation system 308, phone card activation system 304, and the seller may have to negotiate a contract to settle any service fee issues. For instance, financial network 305 usually receives a fee or expenses from the seller for each financial transaction. Manufacturer warranty activation system 308 usually pays a fee to code processing system 304 to acquire product registrations and for warranty activations.

Those skilled in the art will appreciate variations of the above-described embodiments that fall within the scope of the invention. As a result, the invention is not limited to the specific examples and illustrations discussed above, but only by the following claims and their equivalents.

I claim:

1. A method of registering warranties on products using phone cards, the method comprising the steps of:

packaging a phone card with a separate product wherein the phone card includes a phone card code;

obtaining a financial card number with a point of sale system for the purchase of the product;

obtaining the phone card code from the phone card with the point of sale system upon purchase of the product;

transmitting the financial card number, a charge authorization request for the financial card number, and the phone card code from the point of sale system to a code processing system;

transmitting the financial card number and the charge authorization request from the code processing system to a financial network;

receiving an authorization response in the code processing system from the financial network and processing the phone card code to determine product information and manufacturing information for the product if the authorization response indicates that the charge to the financial card number was allowed;

transmitting a warranty activation request and the product information from the code processing system to a manufacturer warranty activation system based on the manufacturer information to activate a warranty on the product; and transmitting the phone card code and a phone card activation request from the code processing system to a phone card activation system to activate the phone card.

2. The method of claim 1 wherein the phone card code comprises a pre-paid phone card code.

3. The method of claim 1 wherein financial card number includes one of a credit card number, a debit card number, or a bank card number.

4. The method of claim 1 wherein the step of processing the phone card code to determine product information and manufacturing information for the product comprises:

looking up the phone card code in a database, where each phone card code in the database corresponds with a product and a manufacture.

5. The method of claim 1 wherein the product information includes one of a serial number, a model number, or a product price.

6. The method of claim 1 further comprising the step of:

formatting the product information based on the manufacturer information before transmitting the product information from the code processing system to the manufacturer warranty activation system.

7. The method of claim 1 further comprising the steps of:

receiving a warty activation response in the code processing system from the manufacturer warranty activation system identifying that the warranty on the product is activated;

receiving a phone card activation response in the code processing system from the phone card activation system identifying that the phone card is activated; and transmitting the warranty activation response, the phone card activation response and the authorization response to the point of sale system.

8. The method of claim 7 further comprising the step of:

printing a warranty activation certificate based on the warranty activation response in the point of sale system.

9. The method of claim 1 further comprising the step of:

determining how to communicate with the manufacturer warranty activation system based on the manufacturer information.

10. The method of claim 1 wherein the code processing system communicates with the point of sale system the manufacturer warranty activation system, and the phone card activation system over a Public Switched Telephone Network (PSTN).

11. A warranty activation system, comprising:
a point of sale system configured to obtain a financial card number for a purchase of a product, obtain a phone card code from a phone card upon purchase of the product, where the phone card is separated from and is packaged with the product, and transmit the financial card number, a charge authorization request for the financial card number, and the phone card code; and
a code processing system configured to receive the financial card number, the charge authorization request for the financial card number, and the phone card code, transit the financial card number and the charge authorization request to a financial network, receive an authorization response from the financial network, process the phone card code to determine product information and manufacturing information for the product if the authorization response indicates that the charge to the financial card number was allowed, transmit a warranty activation request and the product information to a manufacturer warranty activation system based on the manufacturer information to activate a warranty on the product, and transmit the phone card code and a phone card activation request to a phone card activation system to activate the phone card.

12. The warranty activation system of claim 11 wherein the phone card code comprises a prepaid phone card code.

13. The warranty activation system of claim 11 wherein financial card number includes one of a credit card number, a debit card number, or a bank card number.

14. The warranty activation system of claim 11 wherein the code processing system is further configured to:
look up the phone card code in a database, where each phone card code in the database corresponds with a product and a manufacturer.

15. The warranty activation system of claim 11 wherein the product information includes one of a serial number, a model number, or a product price.

16. The warranty activation system of claim 11 wherein the code processing system is further configured to:
format the product information based on the manufacturer information before transmitting the product information to the manufacturer warranty activation system.

17. The warranty activation system of claim 11 wherein the code processing system is further configured to:
receive a warranty activation response from the manufacturer warranty activation system identifying that the warranty on the product is activated;
receive a phone card activation response from the phone card activation system identifying that the phone card is activated; and
transmit the warranty activation response, the phone card activation response, and the authorization response to the point of sale system.

18. The warranty activation system of claim 17 wherein the point of sale system is further configured to:
print a warranty activation certificate, based on the warranty activation response.

19. The warranty activation system of claim 11 wherein the code processing system is further configured to:
determine how to communicate with the manufacturer warranty activation system based on the manufacturer information.

20. The warranty activation system of claim 11 wherein the code processing system communicate with the point of sale system, the manufacturer warty activation system and the phone card activation system over a Public Switched Telephone Network (PSTN).

* * * * *